United States Patent [19]

Owens

[11] Patent Number: 4,470,769

[45] Date of Patent: Sep. 11, 1984

[54] TAMPER-RESISTANT SEAL FOR A FUEL INJECTION PUMP

[75] Inventor: Daniel C. Owens, Carrboro, N.C.

[73] Assignee: Deere & Company, Moline, Ill.

[21] Appl. No.: 470,363

[22] Filed: Feb. 28, 1983

[51] Int. Cl.³ .............................................. F04B 21/00
[52] U.S. Cl. .................................... 417/313; 137/382; 261/DIG. 38; 261/DIG. 84
[58] Field of Search .............................. 137/382, 384; 261/DIG. 38, DIG. 84; 417/313; 123/198 C, 198 E

[56] References Cited

U.S. PATENT DOCUMENTS

| | | | |
|---|---|---|---|
| 2,142,048 | 12/1938 | Davis et al. | 70/440 |
| 4,272,458 | 6/1981 | Ruth et al. | 137/382 X |
| 4,273,730 | 6/1981 | Byrnes | 137/382 X |
| 4,308,220 | 12/1981 | Tateno | 137/382 X |

*Primary Examiner*—Edward K. Look

[57] ABSTRACT

A tamper-resistant seal is disclosed for discouraging unauthorized access to an adjusting screw located in a fuel injection pump. The seal includes a bracket secured by one-way fasteners to the pump and is positioned adjacent to the adjusting screw. The bracket also includes a stud projecting outwards from its outer surface. A cover having an aperture formed therein is positioned over the bracket such that the stud passes through the aperture. When so aligned, the cover will completely enclose the one-way fasteners and the adjusting screw thereby preventing access to them. The cover is secured to the bracket by a fastener which locks onto the stud. The fastener prevents the removal of the cover from the bracket without physically destroying the seal. Such a seal is beneficial in providing visual assurance to the manufacturer that his pump has not been tampered with.

12 Claims, 1 Drawing Figure

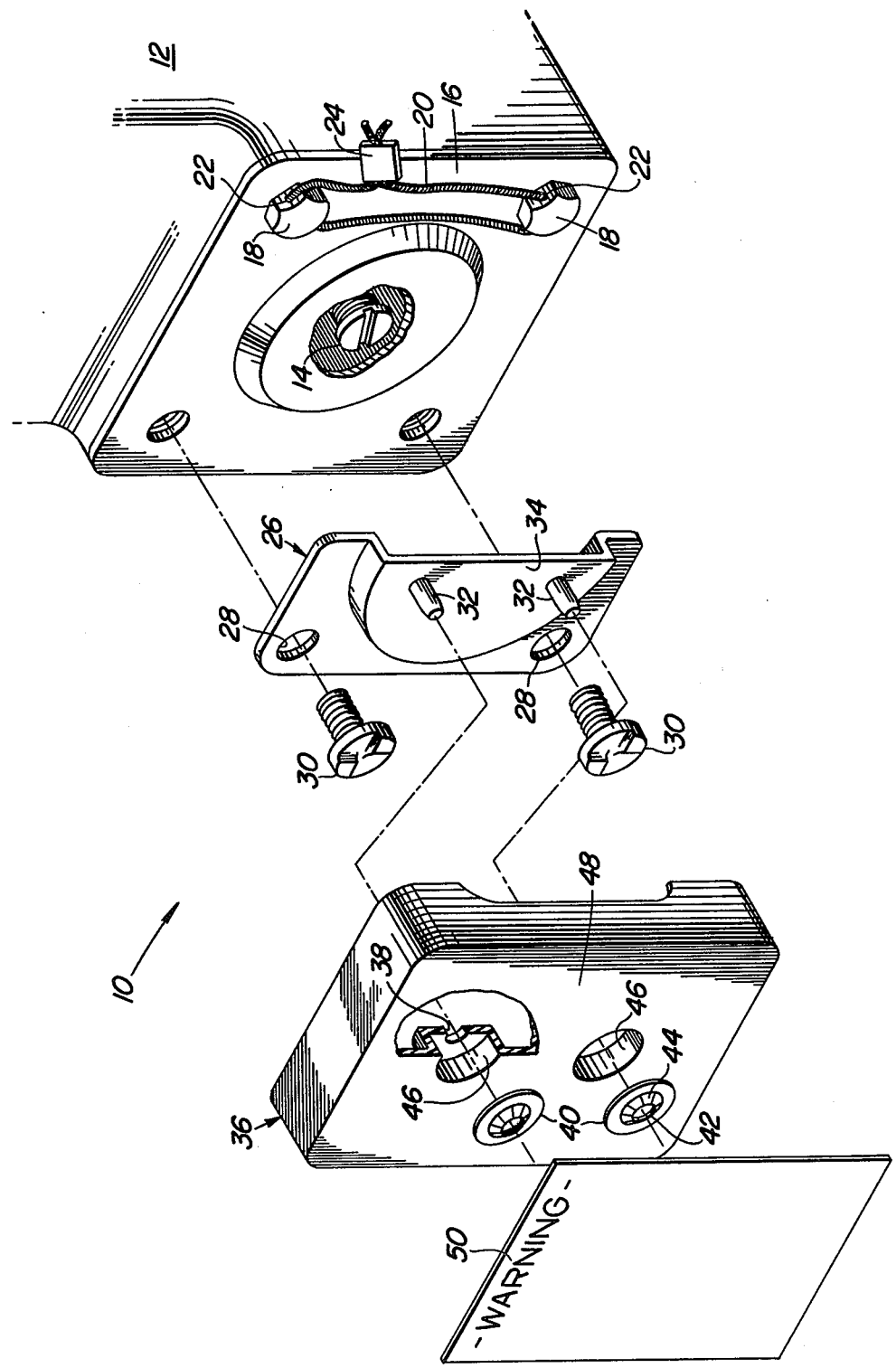

TAMPER-RESISTANT SEAL FOR A FUEL INJECTION PUMP

FIELD OF THE INVENTION

This invention relates to a tamper-resistant seal for discouraging unauthorized access to an adjusting screw in a fuel injection pump.

BACKGROUND OF THE INVENTION

Currently, many agricultural and industrial vehicles are equipped with diesel engines which use a fuel injection pump for delivering fuel to the engine. Such fuel injection pumps normally include an adjusting screw which can be set to deliver a specific amount of fuel to the engine. It is common practice for the manufacturers of such vehicles to set the adjusting screw at a predetermined setting and then to attach a cover plate over the adjusting screw. The cover plate can be equipped with a tag wire and a metal seal so as to visually indicate any possible tampering with the adjusting screw. The manufacturers take these precautions because any disturbance of the adjusting screw could lead to a premature failure of the engine components.

Up until now, the tag wire and metal seal have not sufficiently discouraged operators from removing the cover plate in adjusting the adjusting screw to their particular desires. This has not only lead to premature failure of some engine components but has raised questions as to the extent to which warranties apply. Therefore, there is a need to provide a tamper-resistant seal which will discourage an operator from obtaining access to the adjusting screw while leaving positive, visible evidence should an adjustment be attempted.

Now a tamper-resistant seal has been invented which will solve the above-identified problem.

SUMMARY OF THE INVENTION

Briefly, this invention relates to a tamper-resistant seal for discouraging unauthorized access to an adjusting screw located in a fuel injection pump. The adjusting screw is normally protected by a cover plate which is attached to the pump. The seal includes a bracket attached to the cover plate and positioned adjacent to the adjusting screw by one-way fasteners. The bracket has at least one stud projecting outwards from its outer surface. A fragile cover having an aperture formed therein is positioned over the bracket such that the stud projects through the aperture. By aligning the stud through the aperture the cover can be aligned over the bracket such that the one-way fasteners and the adjusting screw are both completely enclosed. The cover is secured to the bracket by a locking member which fits onto the stud thereby preventing access to the adjusting screw without physically breaking the seal.

The general object of this invention is to provide a tamper-resistant seal for discouraging unauthorized access to an adjusting screw while leaving positive, visible evidence should an adjustment be attempted. A more specific object of this invention is to provide a tamper-resistant seal to discourage unauthorized access to an adjusting screw in a fuel injection pump.

Another object of this invention is to provide a tamper-resistant seal which will provide visual assurance that an adjusting screw has not been tampered with.

Still further, an object of this invention is to provide a tamper-resistant seal which can not be removed except by destroying the seal.

Still another object of this invention is to provide a simple and economical tamper-resistant seal for discouraging access to an adjustable member.

Still another object of this invention is to provide a tamper-resistant seal which permits a warning decal to be attached thereto.

Other objects and advantages of the present invention will become more apparent to those skilled in the art in view of the following description and the accompanying drawing.

BRIEF DESCRIPTION OF THE DRAWING

The FIGURE is an exploded perspective view of the tamper-resistant seal.

DETAILED DESCRIPTION OF THE PREFERRED EMBODIMENT

Referring to the FIGURE, a tamper-resistant seal 10 is shown which can be attached to device 12, such as a fuel injection pump, to discourage access to an adjustable screw 14 which is located within the pump 12. Normally the adjusting screw 14 is enclosed by a cover plate 16 which is secured to the pump 12 by a plurality of screws 18. In order to discourage tampering, a sealing wire 20 is routed through openings 22 formed in the screws 18 and the ends are secured together by a metal seal 24. However, the sealing wire 20 and the metal seal 24 are not sufficient to prevent readjustment of the adjusting screw 14 by the operator and are such that it is difficult to identify when they have been tampered with.

The new tamper-resistant seal 10 is designed to be useable with or without such sealing wire and metal seals. The seal 10 includes a fragile bracket 26, preferably plastic, having at least one, and preferably two apertures 28 formed therein. The apertures 28 provide a means for securing the bracket 26 to both the cover plate 16 and the pump 12 by fasteners 30. The fasteners 30 can be cap screws having a head that permits one-way fastening. Such one-way fasteners are presently available on the market and are designed so that they can be tightened but cannot be loosened. The bracket 26 also has surface portions which cooperate with another portion of the seal in a manner set forth below. In the preferred embodiment the surface portions are in the form of a pair of studs 32 which project outwards from the outer surface 34 of the bracket 26.

The seal 10 also includes a fragile cover 36, also preferably plastic, having one or more cooperating surfaces 38 which mate with the surface portion(s) of the bracket 26 to form an inseparable union. In the preferred embodiment, the cooperating surfaces 38 are apertures formed therein which align with the studs 32 formed on the bracket 26. The studs 32 permit the cover 36 to be aligned on the bracket such that the cover 36 completely encloses the fasteners 30 while preventing movement of the cover 36 relative to the bracket 26. It is also possible to design the configuration of the bracket 26 and the cover 36 such that a single tab or stud will prevent rotation or movement therebetween. For example, a rectangular configuration of both the bracket 26 and the cover 36 would suffice and an engaging tab and lip could join the two members together. Whichever method of alignment and attaching is used, it should be noted that the cover 36 should not be movable on the bracket 26 such that the fasteners 30 would be exposed.

The cover 36 is permanently attached to the bracket 26 by a locking device 40. As shown, the locking device 40 consists of a pair of push-on fasteners having a central opening 42 encircled by an expandable collar 44. Such push-on fasteners are thin, inexpensive metal parts which are available on the market today and operate such that as the fastener 40 is inserted over the stud 32, the expandable collar is deformed such that it will prevent removal of the fastener in the opposite direction off of the stud 32. Such fasteners 42 are difficult to remove and normally are not designed to be reused. However, an additional precaution to removal is the formation of recesses 46 in an outer surface 48 of the cover 36. The recesses 46, which are aligned with one of the corresponding apertures 38 are configured and sized to receive the fasteners 40. Thus, it will be virtually impossible for one to easily attach a tool to the outer surface of the fasteners 40 in the hope of removing them. This means that if one wishes to tamper with the adjusting screw 14, one will have to physically break the fragile cover 36 and bracket 26. In so doing, there will be a visual indication to the manufacturer that someone has tampered with the device. Furthermore, it will be impossible for the tamperer to reassemble the seal once it has been broken since no replacement parts will be available, not even to the people who service the equipment.

The seal 10 also permits the attachment of a warning decal 50 onto the outer surface 48 of the cover 36 so as to display a warning to the purchaser or operator. This warning can state the adverse effects that could occur should one tamper with the adjusting screw 14 as well as providing a psychological deterant to any tampering. The warning decal also serves to hide the locking device 40, thereby concealing indication as to how to proceed with removal of the cover 36.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifictions, and variations which fall within the spirit and scope of the appended claims.

I claim:

1. A tamper-resistant seal for discouraging access to an adjustable member, said seal comprising:
   (a) a bracket secured by first attachment means about said adjustable member so as to block access to said adjustable member;
   (b) a cover attachably mounted to said bracket to prevent access to said first attachment means, said cover having a general configuration which cooperates with the configuration of said bracket to assure alignment therebetween; and
   (c) locking means for securely fastening said cover to said bracket such that access to said adjustable member is prevented without physically breaking said seal.

2. A tamper-resistant seal for discouraging access to an adjustable member, said seal comprising:
   (a) a bracket secured by first attachment means about said adjustable member, and having at least one attachment member projecting outward therefrom;
   (b) a cover having an aperture formed therein through which said attachment member projects, said cover being aligned with said bracket by said attachment member such that said first attachment means is completely enclosed; and
   (c) locking means for securely fastening said cover to said bracket such that access to said adjustable member is prevented without physically breaking said seal.

3. The seal of claim 2 wherein said first attachment means are capscrews having heads configured to permit one-way fastening.

4. The seal of claim 2 wherein said attachment member is a stud.

5. The seal of claim 2 wherein said locking means is a push-on fastener which deforms as it is secured to said attachment member thereby making removal difficult.

6. The seal of claim 2 wherein said cover has a recess formed in its outer surface about said aperture, said recess being sized and configured to receive said locking means such that once said locking means is secured to said attachment member and is positioned within said recess, physical removal of said locking means is prevented without breaking said seal.

7. The seal of claim 2 wherein said cover and bracket are constructed of a fragile material.

8. The seal of claim 7 wherein said fragile material is plastic.

9. The seal of claim 2 wherein a warning decal is attached to an outer surface of said cover to prevent visual inspection of said locking means and for cautioning against tampering with said adjustable member.

10. In combination with a fuel injection pump having an adjusting screw which is protected by a cover plate which is attached to said pump, a tamper-resistant seal for discouraging access to said adjusting screw, said seal comprising:
    (a) a bracket attached to said cover plate and positioned adjacent to said adjusting screw by one-way fasteners and having a pair of studs projecting outward therefrom;
    (b) a cover having a pair of apertures formed therein through which said pair of studs project, said cover being aligned with said bracket by said studs such that said one-way fasteners are completely enclosed;
    (c) a pair of push-on fasteners engageable with said pair of studs for securely retaining said cover to said bracket; and
    (d) a warning decal attached to an outer surface of said cover for cautioning against tampering with said fuel adjusting screw.

11. The combination as set forth in claim 10 wherein said cover and bracket are constructed of a plastic material.

12. The combination as set forth in claim 10 wherein said cover has a pair of recesses formed in its outer surface about said pair of apertures, said recesses being sized and configured to receive said push-on fasteners such that once said push-on fasteners are secured to said studs and are positioned within said recesses, physical removal of said push-on fasteners is difficult without breaking said cover.

* * * * *

UNITED STATES PATENT AND TRADEMARK OFFICE
CERTIFICATE OF CORRECTION

PATENT NO. : 4,470,769

DATED : 11 September 1984

INVENTOR(S) : Daniel C. Owens and Paul W. Olsen

It is certified that error appears in the above-identified patent and that said Letters Patent is hereby corrected as shown below:

On the title page Item (75) Inventor

Line [75], after "N.C.", insert -- Paul W. Olsen, Cedar Falls, IA --

*Signed and Sealed this*

*Twenty-sixth* Day of *March 1985*

[SEAL]

*Attest:*

DONALD J. QUIGG

*Attesting Officer*     *Acting Commissioner of Patents and Trademarks*